United States Patent
Yang

(10) Patent No.: US 9,148,060 B2
(45) Date of Patent: Sep. 29, 2015

(54) SWITCHING CONTROLLER WITH BURST MODE MANAGEMENT CIRCUIT TO REDUCE POWER LOSS AND ACOUSTIC NOISE OF POWER CONVERTER

(75) Inventor: Ta-Yung Yang, Taoyuan County (TW)

(73) Assignee: SYSTEM GENERAL CORP., Taipei Hsien (TW)

( * ) Notice: Subject to any disclaimer, the term of this patent is extended or adjusted under 35 U.S.C. 154(b) by 384 days.

(21) Appl. No.: 12/356,592

(22) Filed: Jan. 21, 2009

(65) Prior Publication Data

US 2009/0219000 A1    Sep. 3, 2009

Related U.S. Application Data

(60) Provisional application No. 61/068,046, filed on Mar. 3, 2008.

(51) Int. Cl.
- *H02M 1/00* (2007.01)
- *H02M 3/335* (2006.01)
- *H02M 3/157* (2006.01)
- *H02M 3/156* (2006.01)
- *H02M 1/44* (2007.01)

(52) U.S. Cl.
CPC ............ *H02M 3/33507* (2013.01); *H02M 1/44* (2013.01); *H02M 3/156* (2013.01); *H02M 3/157* (2013.01); *H02M 2001/0032* (2013.01); *H02M 2001/0035* (2013.01); *Y02B 70/16* (2013.01)

(58) Field of Classification Search
CPC ................... H02M 2001/0035; H02M 3/156; H02M 3/157
USPC .................. 323/282, 283, 284, 285
See application file for complete search history.

(56) References Cited

U.S. PATENT DOCUMENTS

| | | | | |
|---|---|---|---|---|
| 4,309,650 A * | 1/1982 | Boros et al. | | 323/283 |
| 6,157,177 A * | 12/2000 | Feldtkeller | | 323/267 |
| 6,903,536 B2 * | 6/2005 | Yang | | 323/266 |
| 7,026,851 B2 * | 4/2006 | Yang et al. | | 327/172 |
| 7,298,124 B2 * | 11/2007 | Kan et al. | | 323/283 |
| 7,492,619 B2 * | 2/2009 | Ye et al. | | 363/97 |
| 7,728,571 B2 * | 6/2010 | Chuang et al. | | 323/283 |
| 8,278,900 B2 * | 10/2012 | Strijker et al. | | 323/284 |

* cited by examiner

*Primary Examiner* — Jue Zhang
*Assistant Examiner* — Lakaisha Jackson
(74) *Attorney, Agent, or Firm* — Ming Chow; Sinorica, LLC

(57) ABSTRACT

A switching controller of power converter according to the present invention comprises a PWM circuit and a burst-mode management circuit to reduce the power loss and the acoustic noise of the power converter at light-load. The PWM circuit generates a PWM signal. The burst-mode management circuit receives the PWM signal to generate a switching signal for generating a switching current and regulating the output of the power converter. The burst-mode management circuit further generates a current-limit signal in response to the output of the power converter to limit the switching current for reducing the power loss and the acoustic noise of the power converter when the power converter is at light-load.

10 Claims, 4 Drawing Sheets

SWITCHING CONTROLLER WITH BURST MODE MANAGEMENT CIRCUIT TO REDUCE POWER LOSS AND ACOUSTIC NOISE OF POWER CONVERTER

The current application claims a priority to U.S. 61/068,046 filed on Mar. 3, 2008.

BACKGROUND OF THE INVENTION

1. Filed of Invention

The present invention relates to power converters, and more particularly, to the control of power converters.

2. Description of Related Art

The switching controller is an integrated circuit used in the power converter to control and regulate the switching duty-cycle. Being subject to environmental regulations, the power system design of computers and other electrical products have been required to meet the power management and energy conservation standards. For the power management application in the power converter, how to reduce the power loss and acoustic noise in light-load and no-load condition is a main concern.

FIG. 1 shows a schematic diagram of a power converter. The power converter comprises a transformer 10 having a primary winding $N_P$ and a secondary winding $N_S$. The primary winding $N_P$ is coupled to an input voltage $V_{IN}$. The secondary winding $N_S$ generates an output voltage $V_O$ via an output rectifier 40 and an output capacitor 45. The output rectifier 40 is coupled to a first terminal of the secondary winding $N_S$. The output capacitor 45 is coupled to a second terminal of the secondary winding $N_S$ and the output rectifier 40. In order to regulate the output voltage $V_O$, a switching controller 100 generates a switching signal $S_{OUT}$ at an output terminal OUT to switch the transformer 10 via a power switch 20. The power switch 20 is coupled to the primary winding $N_P$. When the power switch 20 is turned on, the input voltage $V_{IN}$ is applied to magnetize the transformer 10. A switching current $I_S$ therefore flows through the primary winding $N_P$ of the transformer 10 and the power switch 20. Through a current-sense device 30, the switching current $I_S$ is converted to a current signal $V_I$ coupled to a current sense terminal VS of the switching controller 100. The current-sense device 30 is coupled between the power switch 20 and a ground.

A feedback voltage $V_{FB}$ coupled to a feedback terminal FB of the switching controller 100 is derived from an output of an optical-coupler 60. An input of the optical-coupler 60 is connected to the output voltage $V_O$ of the power converter through a resistor 51 and a zener diode 50 to form a voltage feedback loop. Once the switching signal $S_{OUT}$ is disabled and the power switch 20 is turned off, the demagnetizing of the transformer 10 is started. The energy stored into the transformer 10 is delivered to the secondary winding $N_S$ during the demagnetizing of the transformer 10. Decreasing the switching frequency or stopping (burst) the switching of the power converter will reduce the power loss at the light-load of power converter. However, the transformer 10 of the power converter might generate acoustic noise if the switching frequency of the power converter falls into the audio band. Following equation shows a magnetic force F generated by the switching current $I_S$ in the transformer 10.

$$F = B \times l \times N \times I_S$$

where B: flux density; l: conductor length; N: winding-turns. Refer to the above equation, we can find limiting the switching current $I_S$ can limit the magnetic force F and reduce the acoustic noise.

SUMMARY OF THE INVENTION

The present invention provides a switching controller with burst-mode management circuit to reduce the power loss and the acoustic noise of the power converter at light-load. The switching controller comprises a PWM circuit and a burst-mode management circuit. The PWM circuit generates a PWM signal. The burst-mode management circuit receives the PWM signal to generate a switching signal for generating a switching current and regulating the output of the power converter. The burst-mode management circuit further generates a current-limit signal in response to the output of the power converter to limit the switching current for reducing the power loss and the acoustic noise of the power converter when the power converter is at light-load.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention. In the drawings, FIG. 1 shows a schematic diagram of a power converter;

DETAILED DESCRIPTION OF PREFERRED EMBODIMENTS

Figure 1:
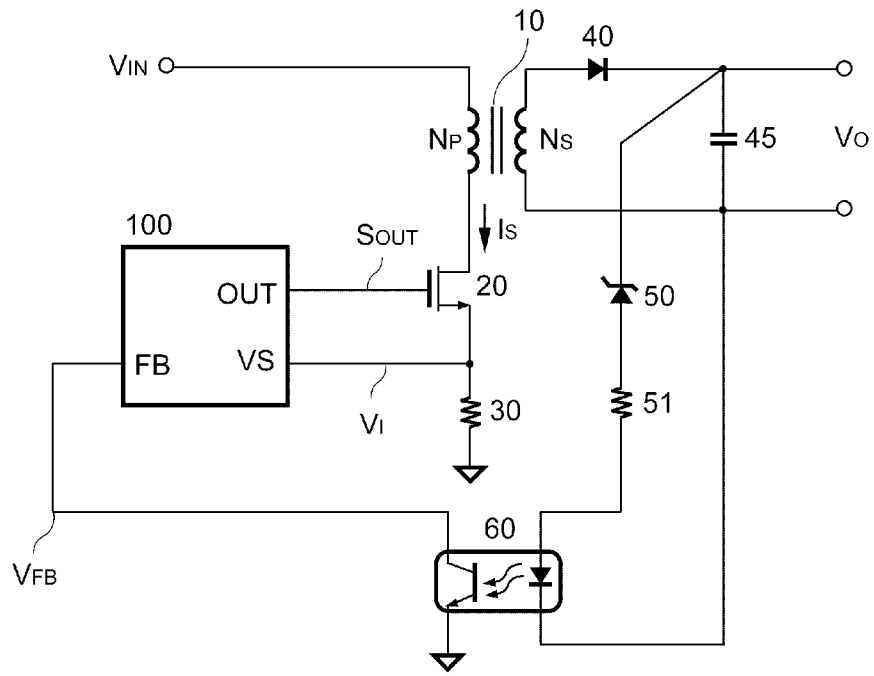
Figure 2:
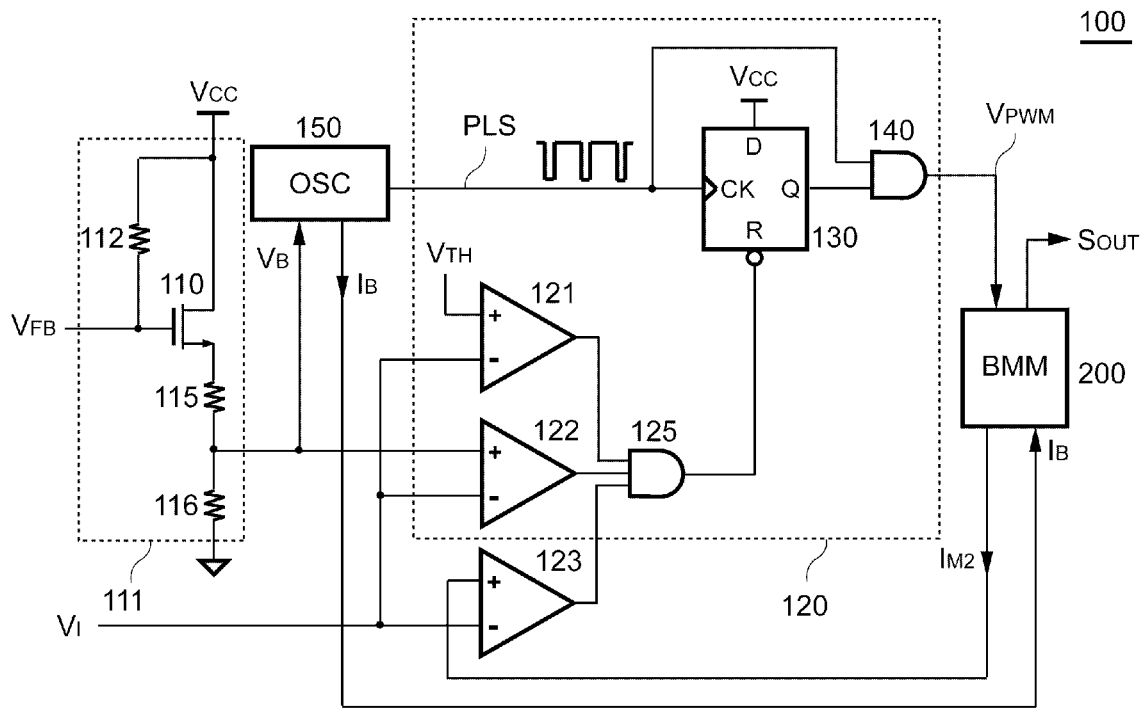
FIG. 2 shows the switching controller of the power converter in accordance with the present invention.

FIG. 2 shows the circuit schematic of the switching controller according to the present invention. The switching controller 100 includes a feedback circuit 111, an oscillator 150 (OSC), a burst-mode management circuit 200 (BMM), a current-limit comparator 123 and a PWM circuit 120. The feedback circuit 111 receives the feedback voltage $V_{FB}$ to generate a voltage signal $V_B$. The feedback voltage $V_{FB}$ is correlated to the output voltage $V_O$ of the power converter (as shown in FIG. 1), and the variation of a loading of the power converter affects the amplitude of the output voltage $V_O$ of the power converter. Therefore, the voltage signal $V_B$ is correlated to the output voltage $V_O$ of the power converter. The oscillator 150 generates a pulse signal PLS and a feedback signal $I_B$ in response to the voltage signal $V_B$. It means that the oscillator 150 generating the feedback signal $I_B$ in response to the output voltage $V_O$ of the power converter that the feedback signal $I_B$ is correlated to the output voltage $V_O$ of the power converter. The PWM circuit 120 generates a PWM signal $V_{PWM}$ in response to the pulse signal PLS, the voltage signal $V_B$ and the current signal $V_I$. The current signal $V_I$ is correlated to the switching current $I_S$ of the power converter (as shown in FIG. 1).

The burst-mode management circuit 200 is coupled to the oscillator 150 and the PWM circuit 120 to receive the feedback signal $I_B$ and the PWM signal $V_{PWM}$ for generating a current-limit signal $I_{M2}$ and the switching signal $S_{OUT}$. It means that the burst-mode management circuit 200 generating the current-limit signal $I_{M2}$ in response to the output voltage $V_O$ of the power converter. Further, the burst-mode management circuit 200 modulates the current-limit signal $I_{M2}$ in response to the feedback signal $I_B$. The switching signal $S_{OUT}$ is used to switch the transformer 10 for regulating the output of the power converter and generate the switching current $I_S$ (as shown in FIG. 1). The current-limit comparator 123 coupled to the burst-mode management circuit 200 and the current-sense device 30 (as shown in FIG. 1) is used to compare the current signal $V_I$ with the current-limit signal $I_{M2}$ to cycle-by-cycle turn off the PWM signal $V_{PWM}$ for limiting the switching signal $S_{OUT}$ to decrease a switching frequency or stop switching of the power converter. Therefore, the switching current $I_S$ (as shown in FIG. 1) of the power converter is limited in response to the current-limit signal $I_{M2}$ to prevent the acoustic noise.

The feedback circuit 111 includes a pull-high resistor 112, a transistor 110 and a voltage divider formed by two resistors 115 and 116 which are connected in series. The pull-high resistor 112 is connected between a supply voltage $V_{CC}$ and a gate of the transistor 110. The feedback voltage $V_{FB}$ is supplied to the gate of the transistor 110. A drain of the transistor 110 is connected to the supply voltage $V_{CC}$. An input of the voltage divider is connected to a source of the transistor 110 for generating the voltage signal $V_B$. The voltage signal $V_B$ is correlated to the feedback voltage $V_{FB}$.

The PWM circuit 120 includes a first comparator 121, a second comparator 122, a first logic circuit 125, a D flip-flop 130 and a second logic circuit 140. A positive input of the first comparator 121 receives a maximum threshold $V_{TH}$. The current signal $V_I$ is supplied to a negative input of the first comparator 121. A positive input of the second comparator 122 receives the voltage signal $V_B$. The current signal $V_I$ is supplied to a negative input of the second comparator 122. A positive input of the current-limit comparator 123 receives the current-limit signal $I_{M2}$. The current signal $V_I$ is supplied to a negative input of the current-limit comparator 123. Three inputs of the first logic circuit 125 are respectively connected to an output of the first comparator 121, an output of the second comparator 122 and an output of the current-limit comparator 123. A clock input CK of the D flip-flop 130 is coupled to the oscillator 150 to receive the pulse signal PLS. The supply voltage $V_{CC}$ is supplied to a D input of the D flip-flop 130. A reset input R of the D flip-flop 130 is connected to an output of the first logic circuit 125 to reset the D flip-flop 130. A first input of the second logic circuit 140 is coupled to the oscillator 150 and the clock input CK of the D flip-flop 130 to receive the pulse signal PLS. A second input of the second logic circuit 140 is connected to an output Q of the D flip-flop 130. An output of the second logic circuit 140 generates the PWM signal $V_{PWM}$. The first logic circuit 125 is disabled to reset the output of the D flip-flop 130 and cycle-by-cycle turn off the PWM signal $V_{PWM}$ as long as one of the comparators 121, 122 and 123 is disabled.

Figure 3:
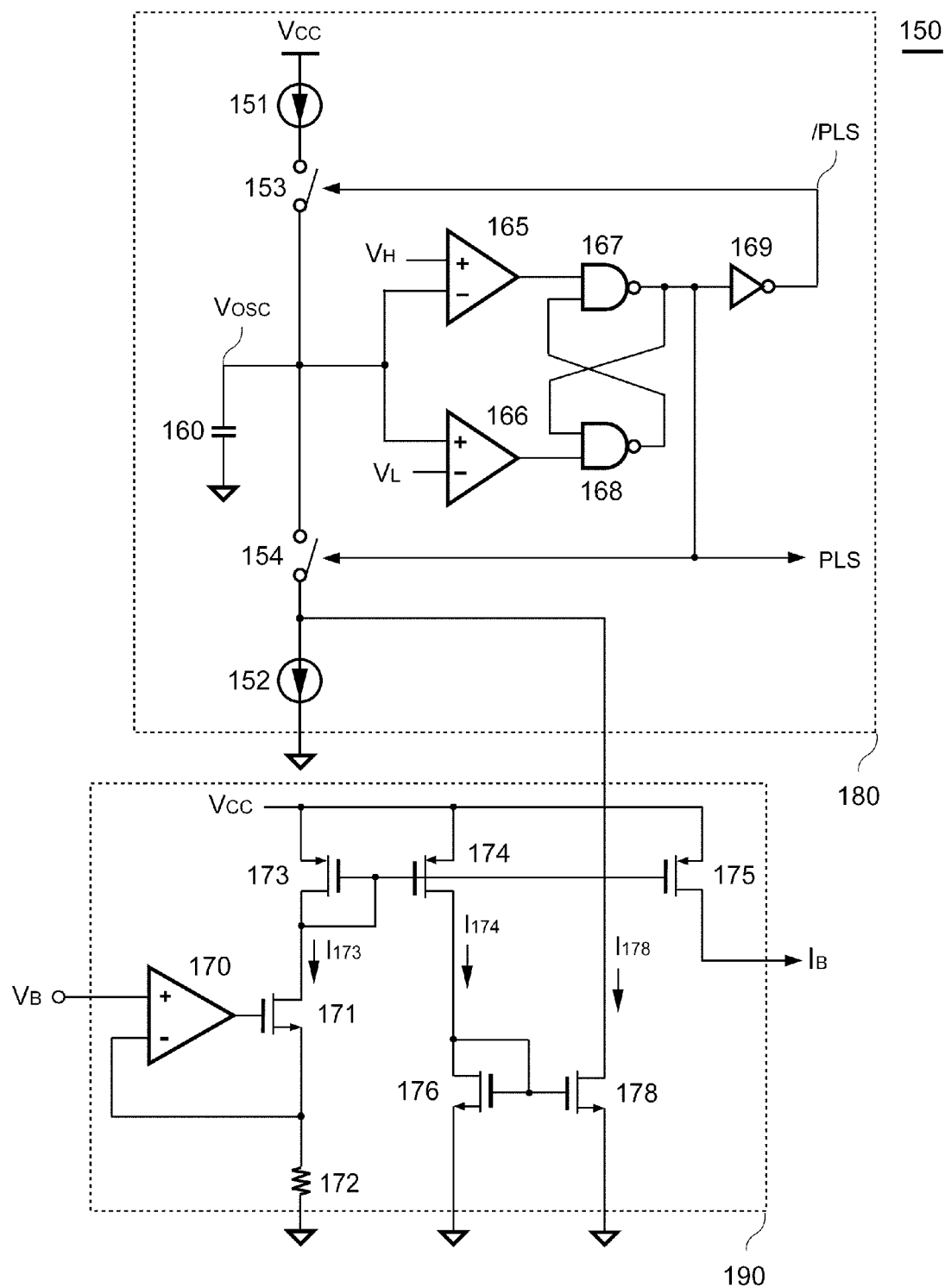
FIG. 3 is the circuit schematic of the oscillator according to the present invention.

FIG. 3 shows a schematic diagram of a preferred embodiment of the oscillator according to the present invention. As shown, the oscillator 150 includes a pulse signal generator 180 and a feedback converter 190. The pulse signal generator 180 includes a charging switch 153, a discharging switch 154, a saw-tooth capacitor 160, a charging current 151, a discharging current 152, a first comparator 165, a second comparator 166, two NAND gates 167 and 168 and an inverter 169. The charging switch 153 is connected between the charging current 151 and the saw-tooth capacitor 160. The charging current 151 is coupled to the supply voltage $V_{CC}$. The discharge switch 154 is connected between the saw-tooth capacitor 160 and the discharging current 152. The discharging current 152 is coupled to the ground. A negative terminal of the saw-tooth capacitor 160 is connected to the ground. An oscillation signal $V_{OSC}$ is generated at a positive terminal of the saw-tooth capacitor 160.

The first comparator 165 has a positive input supplied with a threshold voltage $V_H$. A negative input of the first comparator 165 is connected to the saw-tooth capacitor 160 for receiving the oscillation signal $V_{OSC}$. The second comparator 166 has a negative input supplied with a threshold voltage $V_L$. The threshold voltage $V_H$ is higher than the threshold voltage $V_L$. A positive input of the second comparator 166 is connected to the saw-tooth capacitor 160 for receiving the oscillation signal $V_{OSC}$. An output of the NAND gate 167 generates the pulse signal PLS to turn on/off the discharging switch 154. A first input of the NAND gate 167 is driven by an output of the first comparator 165. Two inputs of the NAND gate 168 are respectively connected to the output of the NAND gate 167 and an output of the second comparator 166. An output of the NAND gate 168 is connected to a second input of the NAND gate 167. An input of the inverter 169 is connected to the output of the NAND gate 167 to receive the pulse signal PLS for generating an inverse pulse signal /PLS. The inverse pulse signal /PLS is used to turn on/off the charging switch 153. The oscillator 150 generates the pulse signal PLS in response to the oscillation signal $V_{OSC}$ at the saw-tooth capacitor 160.

When the charging switch 153 is turned on, the charging current 151 charges the saw-tooth capacitor 160 and the oscillation signal $V_{OSC}$ increases at this time. At this period, the oscillation signal $V_{OSC}$ is lower than the threshold voltage $V_H$ and the discharging switch 154 is turned off. The discharging current 152 discharges the saw-tooth capacitor 160 and the oscillation signal $V_{OSC}$ decreases when the oscillation signal $V_{OSC}$ is over than the threshold voltage $V_H$. At this time, the charging switch 153 is turned off and the discharging switch 154 is turned on. The charging switch 153 will be turned on again when the oscillation signal $V_{OSC}$ is lower than the threshold voltage $V_L$.

As shown in FIG. 3, the feedback converter 190 comprises a V-to-I converter, a first current mirror, a second current mirror and a third current mirror. The V-to-I converter includes an amplifier 170, a transistor 171 and a resistor 172. The voltage signal $V_B$ of the feedback circuit 111 (as shown in FIG. 2) is supplied to a positive input of the amplifier 170. The resistor 172 is connected between a negative input of the amplifier 170 and the ground. A gate of the transistor 171 is connected to an output of the amplifier 170. A source of the transistor 171 is connected to the resistor 172. The V-to-I converter is connected to the feedback circuit 111 for converting the voltage signal $V_B$ into a current signal $I_{173}$ via the resistor 172. The first current mirror includes a transistor 173 and a transistor 174. Two sources of the transistor 173 and the transistor 174 are coupled to the supply voltage $V_{CC}$. A drain of the transistor 173 is connected to a drain of the transistor 171, two gates of the transistor 173 and transistor 174. The current signal $I_{173}$ is generated by the drain of the transistor 173. The first current mirror is connected to the V-to-I converter for receiving the current signal $I_{173}$ to generate a current signal $I_{174}$. The current signal $I_{174}$ is generated by a drain of the transistor 174.

The second current mirror includes a transistor 176 and a transistor 178. A drain of the transistor 176 is connected to the drain of the transistor 174, two gates of the transistor 176 and transistor 178. Two sources of the transistor 176 and the transistor 178 are connected to the ground. The second current mirror receives the current signal $I_{174}$ to generate a current signal $I_{178}$. The current signal $I_{178}$ is generated by a drain of the transistor 178. The discharging switch 154 and the discharging current 152 are connected to an output of the second current mirror to receive the current signal $I_{178}$ proportional to the voltage signal $V_B$. The third current mirror includes the transistor 173 and a transistor 175. A source of the transistor 175 is coupled to the supply voltage $V_{CC}$. A gate of the transistor 175 is coupled to the gate of the transistor 173. The third current mirror is connected to the first current mirror for generating the feedback signal $I_B$ proportional to the voltage signal $V_B$. The feedback signal $I_B$ is generated by a drain of the transistor 175. The decrease of the voltage signal $V_B$ affects the decrease of the current signal $I_{173}$, the current signal $I_{174}$, the current signal $I_{178}$ and the feedback signal $I_B$ when the power converter is at light-load. The oscillator 150 provides an off-time modulation for decreasing the switching frequency to reduce the power loss of the power converter at light-load. The current signal $I_{178}$ and the feedback signal $I_B$ are correlated to the loading of the power converter.

Figure 4:
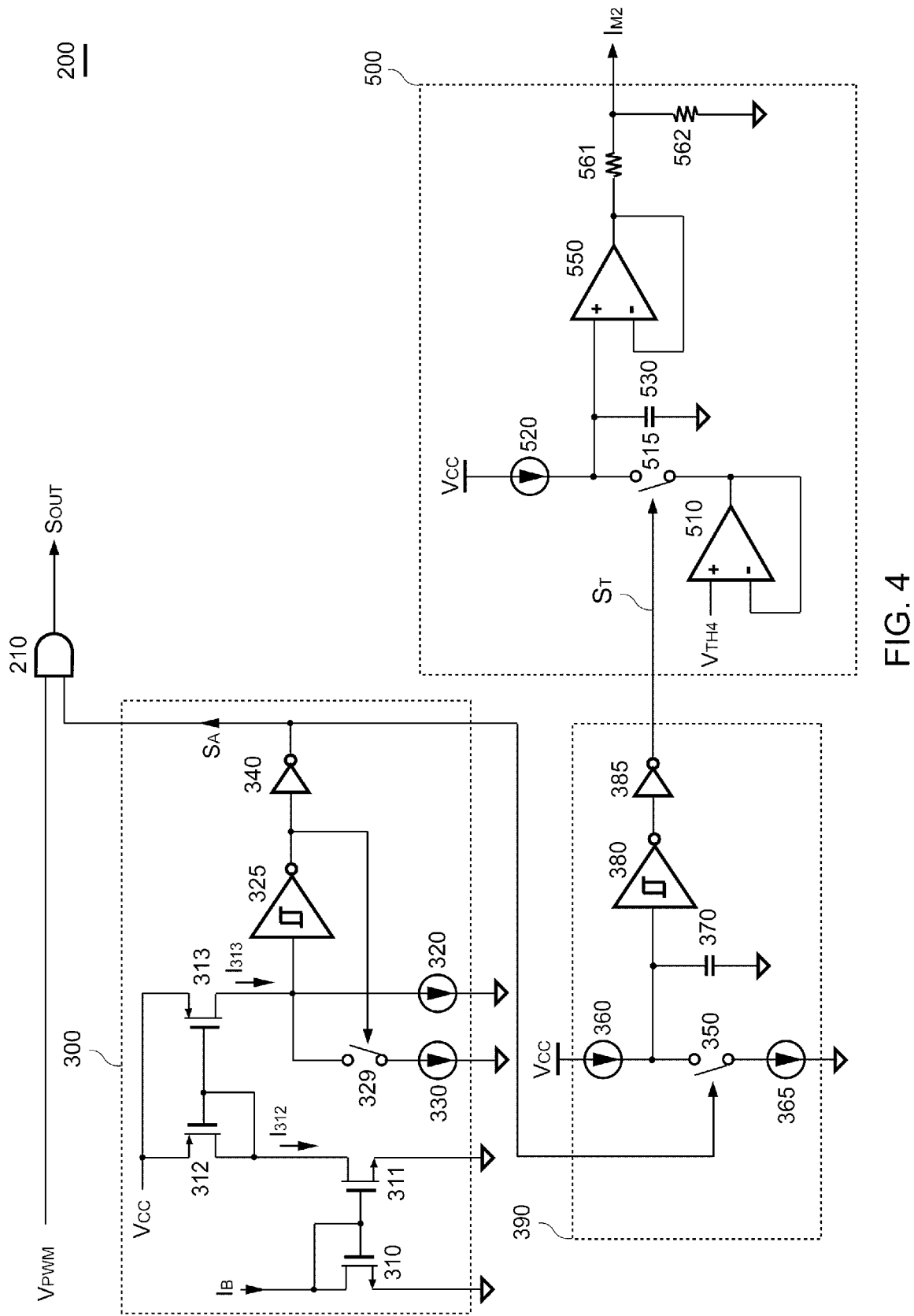
FIG. 4 is the circuit schematic of the burst-mode management circuit according to the present invention.

FIG. 4 shows the circuit schematic of the burst-mode management circuit of the switching controller according to the present invention. The burst-mode management circuit 200 includes a logic circuit 210, a skip circuit 300, a timing circuit 390 and a current-limit circuit 500. The skip circuit 300 includes a first current mirror, a second current mirror, a light-load threshold 320, a switch 329, a constant current 330, a hysteresis inverter 325 and an inverter 340. The first current mirror includes a transistor 310 and a transistor 311. A drain of the transistor 310 receives the feedback signal $I_B$. A gate of the transistor 310 is connected to the drain of the transistor 310 and a gate of the transistor 311. Two sources of the transistor 310 and the transistor 311 are connected to the ground. The first current mirror generates a current signal $I_{312}$ in response to the feedback signal $I_B$.

The second current mirror includes a transistor 312 and a transistor 313. Two sources of the transistor 312 and the transistor 313 are coupled to the supply voltage $V_{CC}$. A drain of the transistor 312 is connected to a drain of the transistor 311, two gates of the transistor 312 and the transistor 313. The current signal $I_{312}$ is generated by the drain of the transistor 312. The second current mirror is connected to the first current mirror for generating a current signal $I_{313}$ in response to the current signal $I_{312}$. A drain of the transistor 313 outputs the current signal $I_{313}$ proportional to the current signal $I_{312}$ and the feedback signal $I_B$. An input of the hysteresis inverter 325 is connected to the drain of the transistor 313 and the light-load threshold 320. The input of the hysteresis inverter 325 is further connected to the constant current 330 via the switch 329. The light-load threshold 320 can be a constant current according to a preferred embodiment of the present invention. An input of the inverter 340 is connected to an output of the hysteresis inverter 325. The switch 329 is controlled by the output of the hysteresis inverter 325. An output of the inverter 340 generates an acoustic signal $S_A$. According to the description above, the skip circuit 300 generates the acoustic signal $S_A$ in response to the feedback signal $I_B$. It means that the skip circuit 300 generates the acoustic signal $S_A$ in response to the output of the power converter due to the feedback signal $I_B$ is correlated to the output of the power converter.

During the light-load condition, the input of the hysteresis inverter 325 is at a low-level when the current signal $I_{313}$ proportional to the feedback signal $I_B$ is lower than the light-load threshold 320. In the meantime, the switch 329 is turned on to reduce the current signal $I_{313}$ via the constant current 330 once the output of the hysteresis inverter 325 is at a high-level. It also means that the constant current 330 is used to ensure the disablement at the input of the hysteresis inverter 325. A first input of the logic circuit 210 is coupled to the PWM circuit 120 (as shown in FIG. 2) to receive the PWM signal $V_{PWM}$. The acoustic signal $S_A$ is applied to a second input of logic circuit 210. An output of the logic circuit 210 generates the switching signal $S_{OUT}$. The switching signal $S_{OUT}$ is disabled when the acoustic signal $S_A$ is at a low-level. Therefore, the skip circuit 300 will turn off the switching signal $S_{OUT}$ to modulate the PWM signal $V_{PWM}$ when the feedback signal $I_B$ is lower than the light-load threshold 320. The switching signal $S_{OUT}$ is used to switch the transformer $T_1$ and generate the switching current $I_S$ (as shown in FIG. 1).

As shown in FIG. 4, the timing circuit 390 includes a switch 350, a charging current 360, a discharging current 365, a capacitor 370, a hysteresis inverter 380 and an inverter 385. The charging current 360 is connected between the supply voltage $V_{CC}$ and the switch 350. The discharging current 365 is connected between the switch 350 and the ground. A first terminal of the capacitor 370 is connected to the charging current 360 and the switch 350. A second terminal of the capacitor 370 is connected to the ground. The switch 350 is controlled by the acoustic signal $S_A$. The capacitor 370 is charged by the charging current 360 when the acoustic signal $S_A$ is disabled. The capacitor 370 is discharged by the discharging current 365 when the acoustic signal $S_A$ is enabled and the switch 350 is turned on. An input of the hysteresis inverter 380 is connected to the capacitor 370, the charging current 360 and the switch 350. An input of the inverter 385 is connected to an output of the hysteresis inverter 380. An output of the inverter 385 generates a control signal $S_T$.

Figure 5:
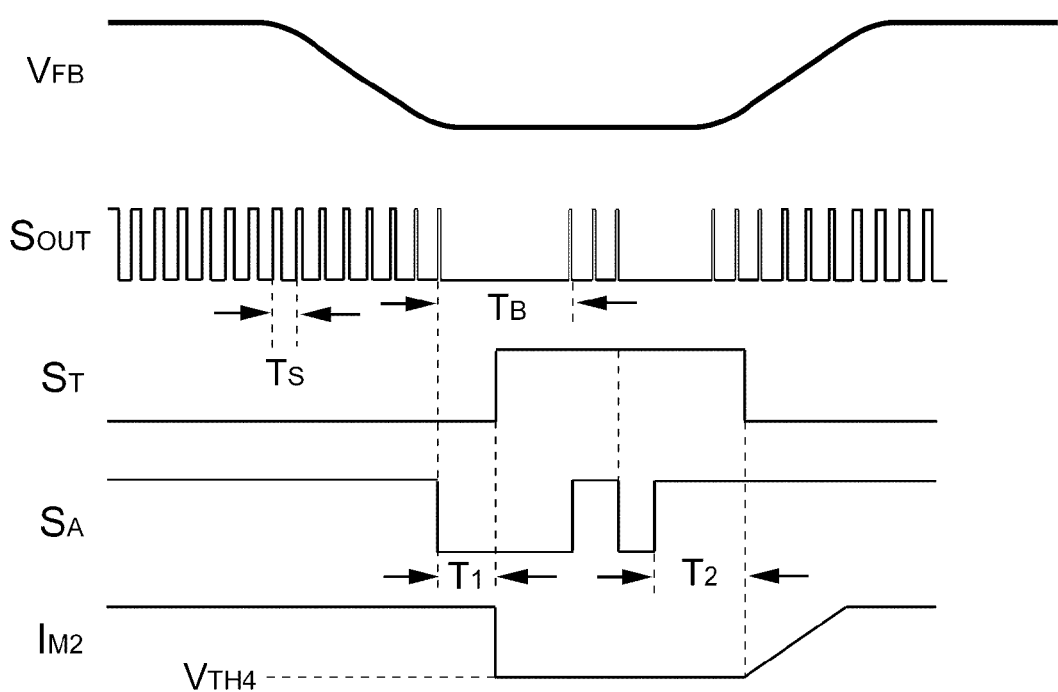
FIG. 5 shows waveform of the feedback voltage, the switching signal, the control signal, the acoustic signal and the current-limit signal according to the present invention.

During the light-load condition, the control signal $S_T$ is enabled after a period $T_1$ (as shown in FIG. 5) when the acoustic signal $S_A$ is at a low-level and the capacitor 370 is charged by the charging current 360. The amplitude of the charging current 360 and the capacitance of the capacitor 370 determine the period $T_1$. The control signal $S_T$ is disabled after a period $T_2$ (as shown in FIG. 5) when the acoustic signal $S_A$ is at a high-level and the capacitor 370 is discharged by the discharging current 365. The amplitude of the discharging current 365 and the capacitance of the capacitor 370 determine the period $T_2$. The timing circuit 390 is developed to generate the control signal $S_T$ in response to the acoustic signal $S_A$ if an off period $T_B$ (as shown in FIG. 5) of the switching signal $S_{OUT}$ might generate acoustic noise.

As shown in FIG. 4, the current-limit circuit 500 includes a first amplifier 510, a charging current 520, a switch 515, a soft-start capacitor 530, a second amplifier 550, two resistors 561 and 562. The switch 515 is connected between the charging current 520 and an output of the first amplifier 510. The charging current 520 is coupled to the supply voltage $V_{CC}$. The switch 515 is controlled by the control signal $S_T$. The first amplifier 510 has a positive input supplied with a limit signal $V_{TH4}$. A negative input of the first amplifier 510 is connected to the output of the first amplifier 510. A first terminal of the soft-start capacitor 530 is connected to the charging current 520 and the switch 515. The first terminal of the soft-start capacitor 530 is also an output of the soft-start capacitor 530. A second terminal of the soft-start capacitor 530 is connected to the ground. The soft-start capacitor 530 is charged by the charging current 520 when the control signal $S_T$ is disabled. The soft-start capacitor 530 is discharged by the first amplifier 510 when the control signal $S_T$ is enabled and the switch 515 is turned on. A positive input of the second amplifier 550 is connected to the output of the soft-start capacitor 530, the charging current 520 and the switch 515. A negative input of the second amplifier 550 is connected to an output of the second amplifier 550. The second amplifier 550 is utilized to generate the current-limit signal $I_{M2}$ in response to the output of the soft-start capacitor 530. A first terminal of the resistor 561 is connected to the output of the second amplifier 550. The resistor 562 is connected between a second terminal of the resistor 561 and the ground.

The current-limit circuit 500 generates the current-limit signal $I_{M2}$ in accordance with the control signal $S_T$. The current-limit signal $I_{M2}$ will be decreased to the limit signal $V_{TH4}$ for limiting the amplitude of the switching current $I_S$ (as shown in FIG. 1) when the control signal $S_T$ is enabled and the switch 515 is turned on. The limit signal $V_{TH4}$ will be regarded as the amplitude of the current-limit signal $I_{M2}$ as long as the soft-start capacitor 530 is discharged. Once the control signal $S_T$ is disabled, the soft-start capacitor 530 will be charged by the charging current 520 and the voltage of the soft-start capacitor 530 will gradually increase the current-limit signal $I_{M2}$ for the soft start operation. The amplitude of the charging current 520 and the capacitance of the soft-start capacitor 530 determine a rising time of the current-limit signal $I_{M2}$. As mention above, the switching current $I_S$ of the power converter is limited to prevent the acoustic noise in response to the current-limit signal $I_{M2}$.

FIG. 5 shows the waveforms of the feedback voltage, the switching signal, the control signal, the acoustic signal and the current-limit signal according to the present invention. As shown, the decrease of the feedback voltage $V_{FB}$ affects the decrease of the voltage signal $V_B$ (as shown in FIG. 2) and the feedback signal $I_B$ (as shown in FIG. 2) when the power converter is at light-load. Once the decrease of the feedback signal $I_B$ is lower than the light-load threshold 320 (as shown in FIG. 4), the acoustic signal $S_A$ is disabled. Therefore, the skip circuit 300 (as shown in FIG. 4) will cycle-by-cycle turn off the switching signal $S_{OUT}$ to modulate the PWM signal $V_{PWM}$ (as shown in FIG. 4) when the acoustic signal $S_A$ is at the low-level. During the light-load condition, the control signal $S_T$ is enabled after the period $T_1$ once the acoustic signal $S_A$ is at the low-level. On the other hand, the current signal $I_{313}$ proportional to the feedback signal $I_B$ is higher than the light-load threshold 320 when the loading of the power converter is increased. It means that the control signal $S_T$ is disabled after the period $T_2$ when the acoustic signal $S_A$ is at the high-level. Therefore, the control signal $S_T$ is coupled to decrease the current-limit signal $I_{M2}$ for limiting the amplitude of the switching current $I_S$ if the off period $T_B$ of the switching signal $S_{OUT}$ might generate acoustic noise.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims or their equivalents.

What is claimed is:

1. A switching controller of power converter, comprising:
   an oscillator generating a feedback signal and a pulse signal in response to an output of the power converter;
   a PWM circuit receiving the pulse signal to generate a PWM signal;
   a burst-mode management circuit receiving the feedback signal and the PWM signal to generate a switching signal and a current-limit signal, the switching signal generating a switching current and regulating the output of the power converter; and
   a current-limit comparator coupled to the burst-mode management circuit and a current-sense device for limiting the switching current to decrease a switching frequency or stop switching of the power converter in response to the current-limit signal and a current signal, the current signal being correlated to the switching current.

2. The switching controller of power converter as claimed in claim 1, further comprising a feedback circuit providing a voltage signal to the oscillator for generating the feedback signal in response to a feedback voltage, the feedback voltage being correlated to the output of the power converter.

3. The switching controller of power converter as claimed in claim 2, wherein the oscillator comprises:
   a feedback converter converting the voltage signal into the feedback signal; and
   a pulse signal generator generating the pulse signal in response to the voltage signal.

4. The switching controller of power converter as claimed in claim 1, wherein the burst-mode management circuit comprises:
   a skip circuit generating an acoustic signal in response to the feedback signal;
   a logic circuit receiving the PWM signal and the acoustic signal to generate the switching signal;
   a timing circuit generating a control signal in response to the acoustic signal; and
   a current-limit circuit generating the current-limit signal in response to the control signal.

5. The switching controller of power converter as claimed in claim 4, wherein the acoustic signal is disabled when the feedback signal is lower than a light-load threshold for turning off the switching signal.

6. The switching controller of power converter as claimed in claim 4, wherein the control signal is enabled when the acoustic signal is disabled, the current-limit signal is decreased to limit the switching current when the control signal is enabled.

7. The switching controller of power converter as claimed in claim 6, wherein the current-limit signal is increased gradually when the control signal is disabled.

8. The switching controller of power converter as claimed in claim 4, wherein the current-limit circuit comprises:
   a soft-start capacitor;
   a charging current charging the soft-start capacitor;
   a first amplifier discharging the soft-start capacitor;
   a switch coupled between the soft-start capacitor and the first amplifier and controlled by the control signal; and
   a second amplifier coupled to the soft-start capacitor for generating the current-limit signal in response to an output of the soft-start capacitor.

9. The switching controller of power converter as claimed in claim 8, wherein the first amplifier has a limit signal, the current-limit signal is decreased to the limit signal for limiting the switching current when the control signal is enabled.

10. The switching controller of power converter as claimed in claim 1, wherein the PWM circuit turns off the PWM signal in response to the current signal and a maximum threshold or the output of the power converter.

* * * * *